March 18, 1941.      A. RONNING      2,235,044
STEERABLE HAND TRUCK
Original Filed May 21, 1938
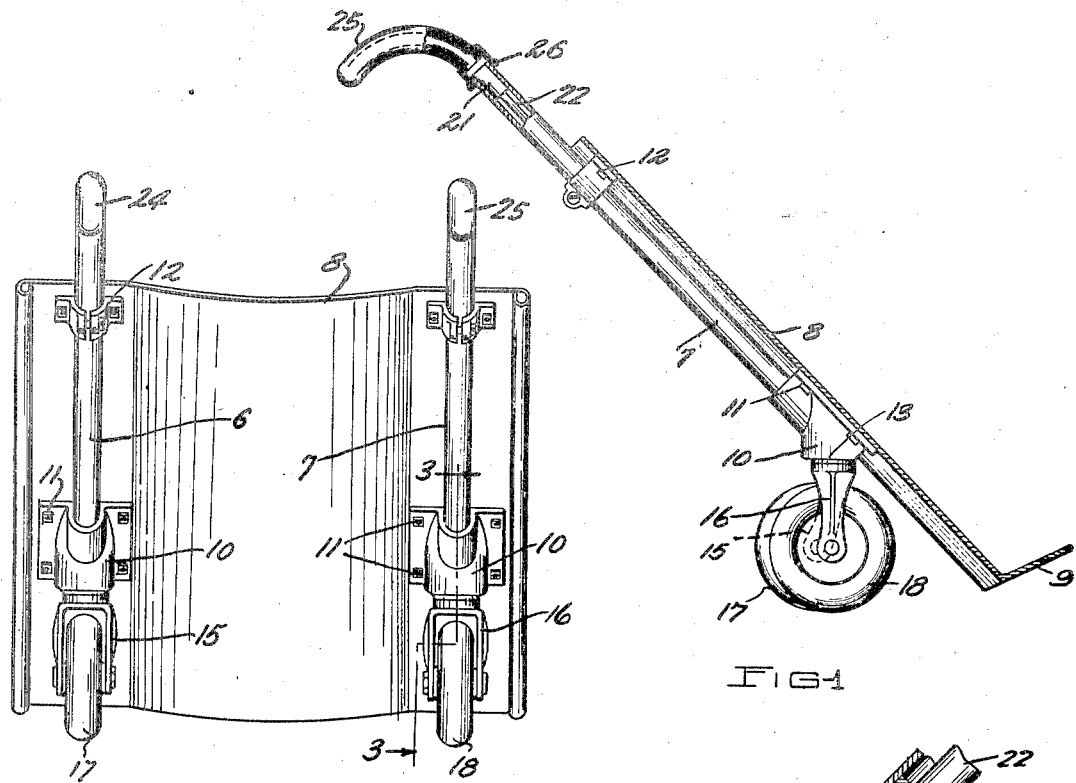
Fig-1
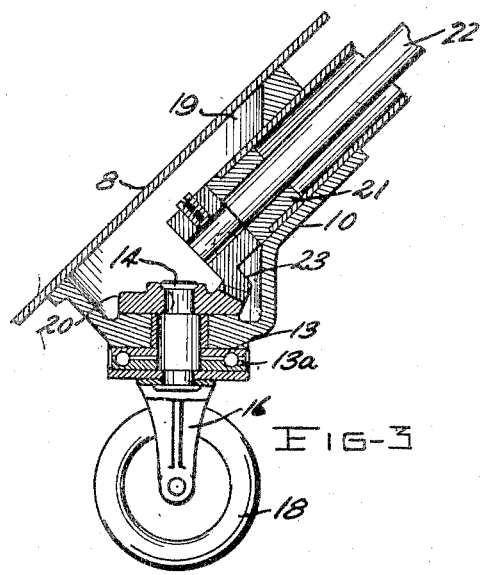
Fig-2
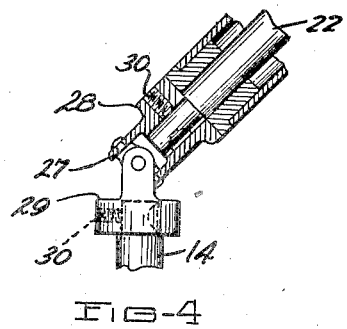
Fig-3
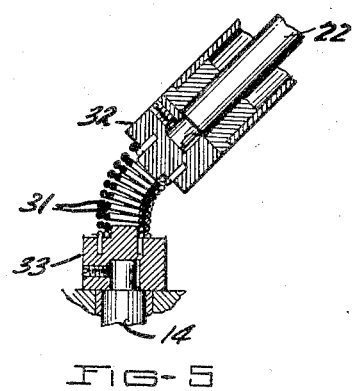
Fig-4
Fig-5
INVENTOR
ADOLPH RONNING
BY
ATTORNEY Patented Mar. 18, 1941

2,235,044

UNITED STATES PATENT OFFICE 2,235,044

STEERABLE HAND TRUCK

Adolph Ronning, Minneapolis, Minn.

Original application May 21, 1938, Serial No. 209,283. Divided and this application March 22, 1940, Serial No. 325,474

8 Claims. (Cl. 280—48)

This invention relates to improvements in hand trucks of the type used for picking up and transporting baggage, crates, boxes, and similar articles.

The primary object of the invention is to provide a means for steering one of these trucks so that it will be possible to steer the forward end of the truck directly in any desired direction and without swinging the rear end to either side as is at present required. Another object is to provide a steering mechanism and mounting for such vehicles in which one wheel is steered by manipulation of the handles of the truck while the other is caster mounted in order to follow in any path taken by the truck. A further object is to provide a handle actuated steering shaft and a steering pin or post for the wheel with novel and effective means for connecting these parts for angling the wheel about an upright axis in response to movement of the handle of the truck.

These and other more detailed and specific objects will be disclosed in the course of the following specification, reference being had to the accompanying drawing, in which—

Fig. 1 is a side elevation of a hand truck constructed in accordance with my invention and with a portion of the frame and handle shown in section.

Fig. 2 is a rear end elevation of the truck.

Fig. 3 is an enlarged vertical section substantially on the line 2—3 in Fig. 2.

Fig. 4 is a sectional detail view showing a modified steering connection between the steering shaft and steering post or pin.

Fig. 5 is a view similar to Fig. 4 but showing still another modification of the steering connection.

This application is a division of my present co-pending application for patent on a Manually propelled vehicle, Serial No. 209,283 filed May 21, 1938.

Referring now more particularly and by reference characters to the drawing, the truck comprises a frame or body made up of spaced, laterally arranged, tubular side or frame members 6 and 7 across which are mounted a body or back plate 8 and a lower foot board or pickup 9. The truck is usually operated in an angular position as shown and the members 6 and 7 slope downwardly and forwardly in this position.

Bearing members or mounting castings 10 are secured to and receive the lower ends of the side members 6 and 7 and are secured as at 11 to the back plate 8 while the upper end portions of the side members are secured to the plate by clamps 12. The bearing members 10 have lower horizontal bearing faces 13 and vertically axised openings to receive the king or pivot pins 14 of the wheel forks 15 and 16 in which the wheels 17 and 18 are journaled. Anti-friction bearings 13a placed between the forks 15 and 16 and the bearing faces 13 permit the wheels to move freely under load about upright axes for steering purposes.

One of the wheel forks, as designated 15, is bent rearwardly at the lower end to cause the associated wheel 17 to caster freely about the upright axis. The other fork 16 has its pivot pin 14, within the interior recess 19 of the bearing member 10, provided with a rigidly mounted gear segment 20 as clearly shown in Fig. 3. Bearing bushings 21 secured within opposite ends of the associated side member 6 support a coaxially arranged steering shaft 22 at the lower end of which a gear segment 23 is mounted in mesh with aforesaid segment 20.

The upwardly and rearwardly extended ends of the side members 6 and 7 are each provided with handles 24 and 25 but the handle 25 on the side member 7 is journaled thereon as shown at 26 in Fig. 1 and is rigidly connected to the upper end of steering shaft 22. It is therefore apparent that by turning this handle 25 the operator may rotate the steering shaft 22, and through the gear segments 20 and 23, oscillate the wheel 18 about an upright axis to steer the truck in any direction. This operation may be carried out while both handles are serving their usual purposes for supporting and propelling the truck and the steering of the one wheel 18 will of course cause the other, caster mounted, wheel 17 to follow along.

As shown in Fig. 4, I may in lieu of the gear segments 20 and 23 above described, employ a universal joint 27 for connecting the steering shaft 22 with the pivot pin 14 of the wheel. The respective members 28 and 29 of the universal joint are secured as shown at 30 to the adjacent ends of the shaft and pin for this purpose. Or as a still further modification as shown in Fig. 5, the steering shaft 22 and pivot pin 14 may be connected by the reversely twisted, coiled, flexible member 31 secured by its end couplings 32 and 33 to the parts. In either case of course the oscillation of the steering shaft, by the handle 25, will be transmitted to the pivot pin for steering the truck.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A hand propelled vehicle comprising a frame supported forwardly by two wheels, one of the wheels being mounted for castering action and the other for steering movements about an upright axis, handles extending rearwardly from the frame for supporting and propelling the same, one of the handles being movably mounted, and means operable by movement of the handle for steering the wheel.

2. A hand propelled vehicle comprising a frame supported forwardly by two wheels, one of the wheels being a caster wheel and the other being mounted for steering movement about a generally upright axis, a handle extending rearwardly from the frame for supporting and propelling the vehicle and movable with respect thereto, a steering member movable by said handle, and gear means connecting the steering member to the steerable wheel for steering the same in response to movement of the handle.

3. A hand propelled vehicle comprising a frame supported forwardly by two wheels, one of the wheels being a caster wheel and the other being mounted for steering movement about a generally upright axis, a handle extending rearwardly from the frame for supporting and propelling the vehicle and movable with respect thereto, a steering member movable by said handle, and a universal joint connection between the steering member and steerable wheel whereby said wheel may be steered by movement of the handle.

4. A hand propelled vehicle comprising a frame supported forwardly by two wheels, one of the wheels being a caster wheel and the other being mounted for steering movement about a generally upright axis, a handle extending rearwardly from the frame for supporting and propelling the vehicle and movable with respect thereto, a steering member movable by said handle, and a flexible connection between the steering member and steerable wheel whereby said wheel may be moved about its upright axis by movement of the handle.

5. A hand propelled vehicle comprising a frame supported forwardly by a pair of wheels, one of the said wheels being a caster wheel and the other having a pivot pin journaled in the frame for steering movements about an upright axis, handles extending rearwardly from the frame for supporting and propelling the vehicle, one of the handles being mounted for oscillating movement, a shaft connected to the handle at one end for oscillation thereby and extending at its other end adjacent the pivot pin, and meshing gear segments secured to the adjacent ends of the pivot pin and shaft for steering the wheel in response to oscillating movement of the handle.

6. A hand propelled vehicle comprising a frame supported forwardly by a pair of wheels, one of the said wheels being a caster wheel and the other having a pivot pin journaled in the frame for steering movements about an upright axis, handles extending rearwardly from the frame for supporting and propelling the vehicle, one of the handles being mounted for oscillating movement, a shaft connected to the handle at one end for oscillation thereby and extending at its other end adjacent the pivot pin, and a universal joint connecting the shaft and pivot pin for steering the wheel.

7. A hand propelled vehicle comprising a frame supported forwardly by a pair of wheels, one of the said wheels being a caster wheel and the other having a pivot pin journaled in the frame for steering movements about an upright axis, handles extending rearwardly from the frame for supporting and propelling the vehicle, one of the handles being mounted for oscillating movement, a shaft connected to the handle at one end for oscillation thereby and extending at its other end and adjacent the pivot pin, and a flexible shaft member connecting the shaft and pivot pin for steering the wheel by oscillation of the handle.

8. A hand propelled vehicle comprising a frame having tubular side members, bearing members secured to forward ends of the side members, a caster wheel connected to one bearing member, a wheel fork having a pivot pin journaled on an upright axis in the other bearing member for steering movements, a wheel in said fork, handles extending rearwardly from the side members for supporting and propelling the vehicle, one of the said handles being oscillatable on an axis coinciding with the axis of the adjacent side member of the frame, a steering shaft journaled within the said side member and connected at a rear end to the oscillatable handle, the forward end of the steering shaft extending into the bearing member to which the wheel fork is pivoted, and means within this bearing member connecting the steering shaft and pivot pin for steering the wheel by oscillation of the handle.

ADOLPH RONNING.